(12) United States Patent
Seminara et al.

(10) Patent No.: US 9,834,058 B2
(45) Date of Patent: Dec. 5, 2017

(54) LINEAR ACTUATOR FOR ADJUSTING THE VERTICAL POSITION OF A SPRING OF A DAMPER AND SPRING UNIT FOR A VEHICLE SUSPENSION AND DAMPER AND SPRING UNIT FOR A VEHICLE SUSPENSION COMPRISING SUCH AN ACTUATOR

(71) Applicant: SISTEMI SOSPENSIONI S.p.A., Corbetta (Milan) (IT)

(72) Inventors: Massimo Seminara, Asti (IT); Massimo Trinchera, Turin (IT)

(73) Assignee: SISTEMI SOSPENSIONI S.p.A., Corbetta (Milan) (IT)

( * ) Notice: Subject to any disclaimer, the term of this patent is extended or adjusted under 35 U.S.C. 154(b) by 0 days.

(21) Appl. No.: 14/955,487

(22) Filed: Dec. 1, 2015

(65) Prior Publication Data
US 2016/0159191 A1 Jun. 9, 2016

(30) Foreign Application Priority Data
Dec. 4, 2014 (IT) .................. 102014902314707

(51) Int. Cl.
*B60G 17/027* (2006.01)
*B60G 15/06* (2006.01)

(52) U.S. Cl.
CPC ....... *B60G 17/0272* (2013.01); *B60G 15/063* (2013.01); *B60G 2202/312* (2013.01);
(Continued)

(58) Field of Classification Search
CPC .................. B60G 17/0272; B60G 15/062; B60G 15/063; B60G 2202/31; B60G 2202/312;
(Continued)

(56) References Cited

U.S. PATENT DOCUMENTS 2,874,955 A * 2/1959 McIntyre ............. B60G 15/062
267/225
3,385,589 A * 5/1968 Erdmann ............. B60G 13/005
267/221
(Continued)

FOREIGN PATENT DOCUMENTS

DE 102005008814 A1 9/2006
EP 1306238 A2 5/2003
(Continued)

OTHER PUBLICATIONS

Italian Search Report issued by the Italian Patent Office for Italian Patent Application No. TO2014A001011 (102014902314707) dated Aug. 6, 2015.

*Primary Examiner* — Vishal Sahni
(74) *Attorney, Agent, or Firm* — Howard & Howard Attorneys PLLC

(57) ABSTRACT

A damper with a cylinder and a rod, a spring arranged around the damper and a linear actuator arranged to change in a controlled manner the axial position of a bottom end of the spring relative to the cylinder of the damper. The actuator comprises an inner cylindrical element arranged to be mounted around the cylinder of the damper, an outer cylindrical element, which is mounted so as to be axially slidable relative to the inner cylindrical element and is arranged to support the bottom end of the spring, and a working chamber arranged to be filled with a fluid under pressure to adjust the axial position of the outer cylindrical element relative to the inner cylindrical element. The working chamber is delimited, both radially and axially, only by the inner cylindrical element and by the outer cylindrical element. The outer cylindrical element is provided with a support flange arranged to support the bottom end of the spring.

12 Claims, 6 Drawing Sheets

(52) U.S. Cl.
CPC ............... *B60G 2202/413* (2013.01); *B60G 2204/1242* (2013.01); *B60G 2500/20* (2013.01); *B60G 2500/30* (2013.01)

(58) Field of Classification Search
CPC ...... B60G 2202/413; B60G 2204/1242; B60G 2500/20
See application file for complete search history.

(56) References Cited

U.S. PATENT DOCUMENTS

| | | | | |
|---|---|---|---|---|
| 3,936,039 | A * | 2/1976 | McKinnon | B60G 15/063 188/322.14 |
| 4,736,931 | A * | 4/1988 | Christopherson | B60G 15/063 188/322.19 |
| 4,830,395 | A * | 5/1989 | Foley | B60G 17/0272 267/177 |
| 5,299,488 | A * | 4/1994 | Kadlicko | B60G 17/0152 188/266.8 |
| 5,401,053 | A | 3/1995 | Sahm et al. | |
| 5,620,172 | A * | 4/1997 | Fulks | B60G 13/006 267/179 |
| 5,961,106 | A | 10/1999 | Shaffer | |
| 5,984,286 | A * | 11/1999 | Busch | B60G 17/0272 267/177 |
| 5,996,982 | A * | 12/1999 | Bell | B60G 15/063 267/221 |
| 6,691,991 | B1 * | 2/2004 | Huang | B60G 15/063 267/286 |
| 2004/0119217 | A1 * | 6/2004 | Kon | B60G 15/063 267/221 |
| 2014/0084528 | A1 * | 3/2014 | Murakami | B60G 17/0272 267/221 |
| 2015/0061203 | A1 * | 3/2015 | Karl | B60G 15/06 267/221 |

FOREIGN PATENT DOCUMENTS

| | | |
|---|---|---|
| FR | 2695875 A1 | 3/1994 |
| WO | 2009033985 A1 | 3/2009 |
| WO | 2012156418 A1 | 11/2012 |
| WO | 2014057334 A1 | 4/2014 |

* cited by examiner

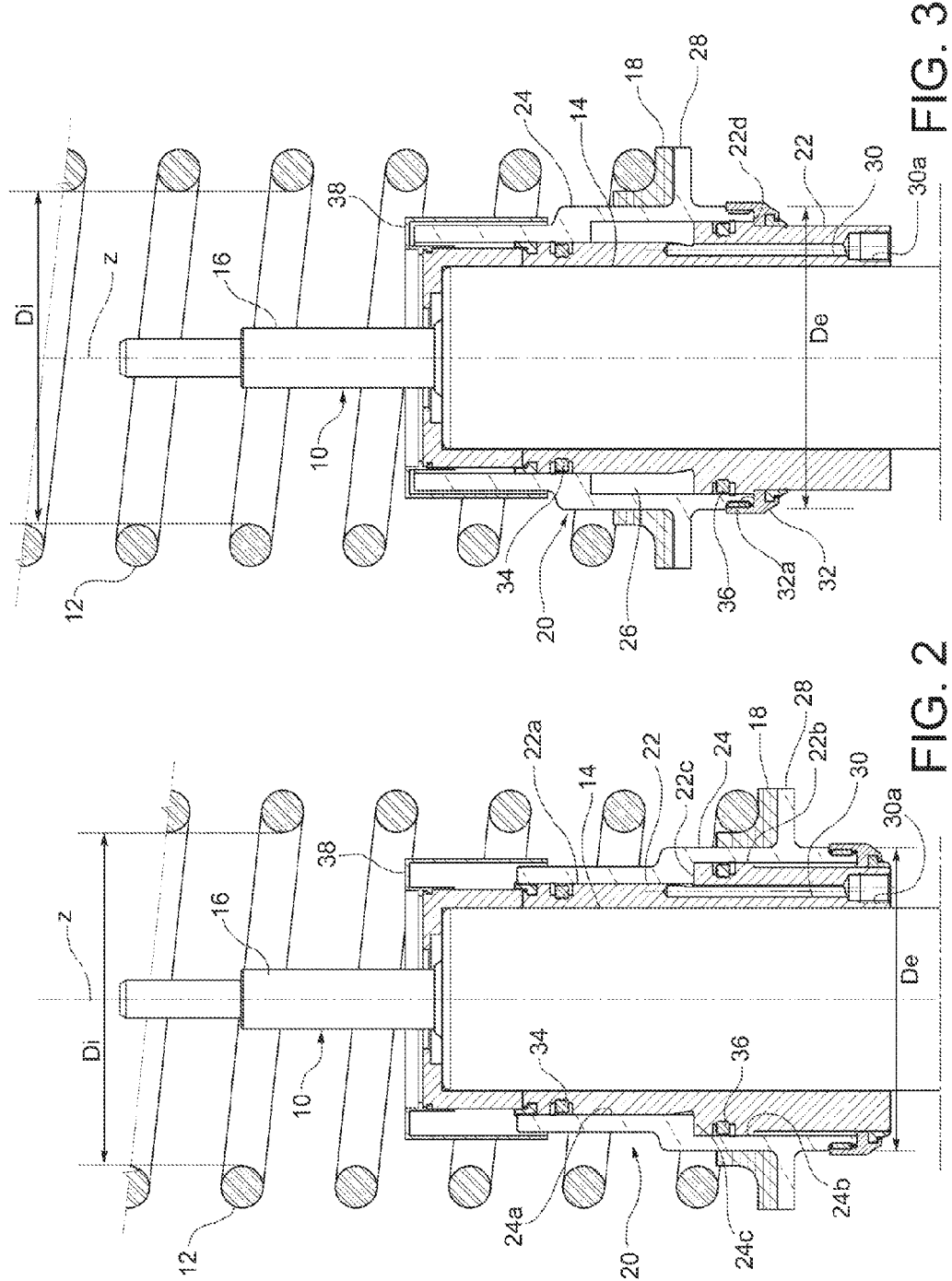

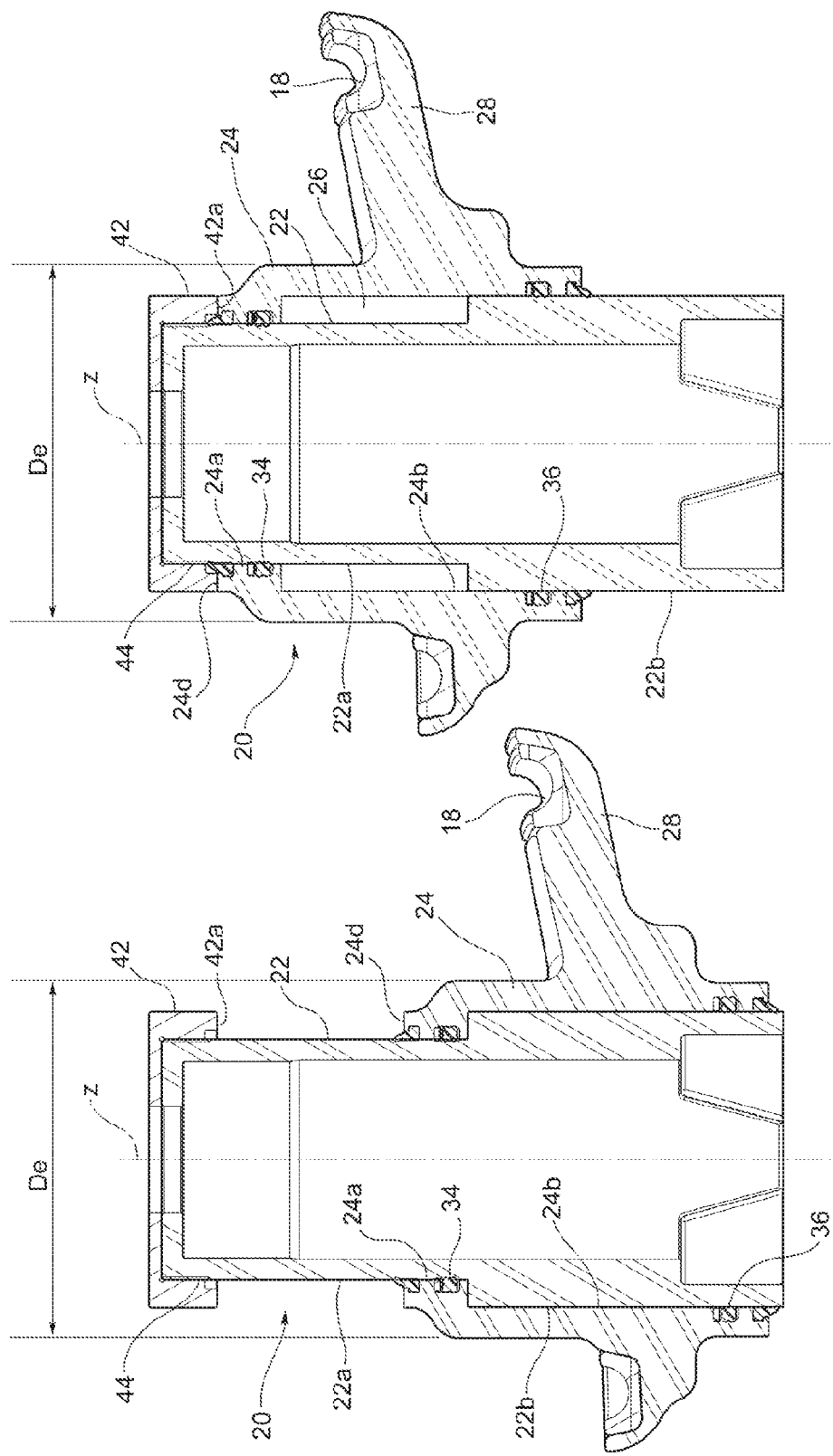

LINEAR ACTUATOR FOR ADJUSTING THE VERTICAL POSITION OF A SPRING OF A DAMPER AND SPRING UNIT FOR A VEHICLE SUSPENSION AND DAMPER AND SPRING UNIT FOR A VEHICLE SUSPENSION COMPRISING SUCH AN ACTUATOR

CROSS-REFERENCE TO RELATED APPLICATIONS

The present application claims priority to and all the benefits of Italian Patent Application No. 102014902314707, filed on Dec. 4, 2014, which is hereby expressly incorporated herein by reference in its entirety.

BACKGROUND OF THE INVENTION

1. Field of the Invention

The present invention relates to a linear actuator intended to be used in a damper and spring unit for a vehicle suspension to allow adjustment of the vertical position of the spring, and hence of the height of the vehicle body from the ground.

2. Description of the Related Art

In a vehicle suspension comprising a damper and spring unit, in which the damper is connected at its bottom end to a wheel-carrier or to a suspension arm and at its top end to the vehicle body and in which the spring is arranged around the damper and rests at its bottom end against a spring plate attached to the damper and at its top end against the vehicle body, it is known to use a linear actuator interposed between the damper and the spring plate to change the vertical position of the spring plate and allow therefore adjustment of the height of the vehicle body from the ground.

WO2009/033985 discloses a damper and spring unit for a vehicle suspension provided with a linear actuator for adjusting the height of the vehicle body from the ground, wherein the linear actuator is interposed between the damper and the spring plate. The linear actuator comprises a cylinder attached to the damper and an annular piston vertically movable relative to the cylinder. The cylinder comprises an inner cylindrical element and an outer cylindrical element which are made as separate pieces. The inner cylindrical element is arranged around the damper, coaxially thereto. A working chamber is provided between the inner cylindrical element and the outer cylindrical element and is supplied with oil under pressure through a fitting. The annular piston is slidably guided in the working chamber. The spring plate is connected to the free end (top end) of the annular piston, whereby a vertical displacement of the annular piston relative to the cylinder results in a corresponding vertical displacement of the spring plate, and hence of the bottom end of the spring, relative to the cylinder, and hence relative to the damper. The linear actuator disclosed in this document is therefore made up of three pieces, namely the inner cylindrical element, the outer cylindrical element and the annular piston. These three pieces define altogether the working chamber, in that the working chamber is enclosed laterally by the inner cylindrical element and by the outer cylindrical element, on its bottom side by the inner cylindrical element and on its top side by the annular piston.

Another example of a linear actuator interposed between the damper and the spring of a damper and spring unit for a vehicle suspension for adjusting the height of the vehicle body from the ground, wherein the linear actuator is made up of three pieces, two of which form the cylinder and the other one forms the piston of the actuator, is known from WO2012/156418 in the Applicant's name. Moreover, according to this known example the spring rests at its bottom end on a spring plate mounted above the piston of the actuator and is therefore wholly arranged above the piston of the actuator.

A linear actuator for adjusting the vertical position of the spring of a damper and spring unit for a vehicle suspension is also disclosed in DE 10 2005 008 814. This known linear actuator is basically made up of only two elements, namely an inner cylindrical element, or cylinder, arranged to be mounted around the cylinder of the damper, and an outer cylindrical element, or piston, which is mounted so as to be axially slidable relative to the inner cylindrical element and is arranged to support the bottom end of the spring. The two cylindrical elements of the actuator enclose, both radially and axially, a working chamber arranged to be filled with a fluid under pressure in order to adjust the axial position of the outer cylindrical element relative to the inner cylindrical element, and hence the vertical position of the bottom end of the spring relative to the cylinder of the damper. According to this known solution, the spring rests on a spring seat provided at the top end of the outer cylindrical element of the actuator, and is therefore wholly arranged above this element of the actuator. Furthermore, this document does neither show nor explain how the movement of the outer cylindrical element in the upward direction is stopped. Moreover, due to the way the spring is supported on the outer cylindrical element, it is very complicated, if not even impossible, to mount a top end-of-travel element arranged to stop the movement of the outer cylindrical element in the upward direction. Therefore, the linear actuator as disclosed in DE 10 2005 008 814 cannot be reduced to practice.

SUMMARY OF THE INVENTION

It is an object of the present invention to provide a linear actuator that can be used in a damper and spring unit for a vehicle suspension to adjust the vertical position of the spring, and hence the height of the vehicle body from the ground, and that represents an improvement over the prior art discussed above.

In short, the invention is based on the idea of providing a linear actuator whose working chamber is wholly enclosed, both radially and axially, by only two pieces, namely an inner cylindrical element, which is intended to be mounted around a cylinder of the damper, and an outer cylindrical element, which is mounted so as to be axially slidable relative to the inner cylindrical element and is arranged to support the spring of the damper and spring unit, wherein the outer cylindrical element is provided with a support flange arranged to support the bottom end of the spring, and hence to act as a bottom spring plate, the support flange being placed beneath the top end of the outer cylindrical element, preferably in the lower half of the outer cylindrical element, whereby the outer cylindrical element is at least partially arranged within the volume of the spring, and extending radially outwards relative to the outer cylindrical element, whereby the inner diameter of the spring is larger than the outer diameter of the outer cylindrical element.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is an axial sectional view showing the linear actuator of FIG. 1 in the minimum extension position corresponding to the minimum vertical position of the bottom end of the spring;

FIG. 3 is another axial sectional view showing the linear actuator of FIG. 1 in the maximum extension position corresponding to the maximum vertical position of the bottom end of the spring;

FIG. 7 is an axial sectional view showing a linear actuator for a damper and spring unit for a vehicle suspension according to a third embodiment of the present invention in the minimum extension position corresponding to the minimum vertical position of the bottom end of the spring;

FIG. 8 is an axial sectional view showing a linear actuator for a damper and spring unit for a vehicle suspension according to a third embodiment of the present invention in the maximum extension position corresponding to the maximum vertical position of the bottom end of the spring.

DETAILED DESCRIPTION OF THE INVENTION

In the following description and claims, terms such as "upper" and "lower" are to be intended as referring to the mounted condition of the damper and spring unit on board of a vehicle. Moreover, the terms "axial" and "longitudinal" and similar terms are used herein to identify the direction of the axis of the linear actuator, which axis coincides with the axis of the damper in the mounted condition, while the term "radial" is used to identify a direction passing through the axis of the damper and lying in a plane perpendicular to this axis.

Figure 1:
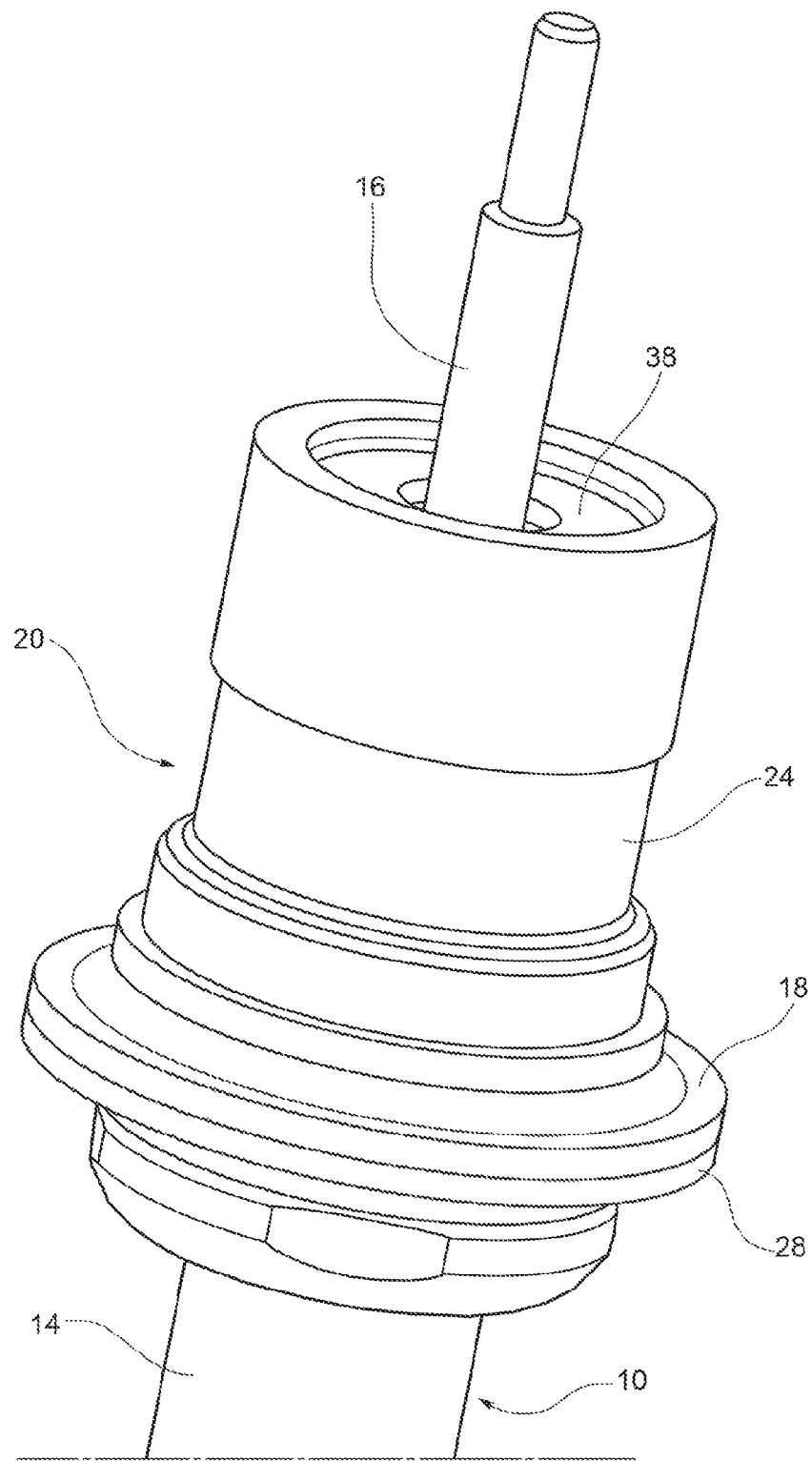
FIG. 1 is a perspective view of a linear actuator for a damper and spring unit for a vehicle suspension according to a first embodiment of the present invention.

With reference first to FIGS. 1 to 3, a damper and spring unit for a vehicle suspension comprises, in per-se-known manner, a damper 10 and a spring 12. Both the damper and the spring are well-known components and therefore they are not described and illustrated in detail herein. Only the elements and parts of these components that are useful for the description of the present invention will be mentioned.

The damper 10 comprises a cylinder 14 which is rigidly connected to a wheel-carrying strut (not shown) and a piston (not shown) which is slidable within the cylinder 14 and has a rod 16 projecting from the top end of the cylinder 14 and extending coaxially thereto. Both the cylinder 14 and the piston with the relating rod 16 are known components. The axis of the cylinder 14 is indicated z and coincides with the direction of the extension and retraction movement of the rod 16 relative to the cylinder 14. The axis z is typically oriented vertically or slightly inclined to the vertical. The rod 16 is secured at its top end to the vehicle body (not shown). The spring 12 is made as a helical spring and extends around the rod 16 of the damper 10.

The damper and spring unit comprises a hydraulic linear actuator (hereinafter simply referred to as actuator), generally indicated 20, arranged to change in a controlled manner the vertical position of the spring 12, more specifically the vertical position of the bottom end of the spring 12, in order for example to adjust the height of the vehicle body from the ground. The actuator 20 is interposed between the cylinder 14 of the damper 10 and the spring 12 so as to allow adjustment of the relative position of the bottom end of the spring 12 with respect to the cylinder 14 of the damper 10 along the axis z, and hence adjustment of the vertical position of the bottom end of the spring 12, for example in order to change the height of the vehicle body from the ground or to keep the height of the vehicle body from the ground at the same level compensating for changes in height due to changes in the load bearing on the vehicle.

The actuator 20 basically comprises an inner cylindrical element 22 and an outer cylindrical element 24 which enclose a working chamber 26 and act as cylinder and piston of the actuator 20, respectively. The inner cylindrical element 22 is attached to the cylinder 14 of the damper 10. The outer cylindrical element 24 is mounted around the inner cylindrical element 22, coaxially thereto. The outer cylindrical element 24 is provided with a support flange 28 which supports the bottom end of the spring 12 and acts therefore as bottom spring plate. The support flange 28 is preferably made in one piece with the outer cylindrical element 24. Preferably, a ring of elastomeric material 18 is interposed between the bottom end of the spring 12 and the support flange 28. The support flange 28 is placed beneath the top end of the outer cylindrical element 24, preferably in the lower half of this element, and extends radially outwards with respect to this element. The outer cylindrical element 24 is thus at least partially arranged within the volume defined by the spring 12 and the inner diameter (indicated Di) of the spring 12 is larger than the outer diameter (indicated De) of the outer cylindrical element 24 (flange excluded).

The outer cylindrical element 24 is axially slidable relative to the inner cylindrical element 22 between a minimum height position (FIG. 2), corresponding to the condition of minima height of the bottom end of the spring 12 from the ground, and a maximum height position (FIG. 3), corresponding to the condition of maximum height of the bottom end of the spring 12 from the ground. The working chamber 26 can be supplied with fluid (oil) under pressure and is connectable to this end with a supply of fluid under pressure (not shown) through a supply passage 30 in the inner cylindrical element 22, preferably a supply passage 30 extending vertically from a supply fitting 30a provided in the bottom face of the inner cylindrical element 22. Supplying the working chamber 26 with fluid under pressure starting from the minimum height position of FIG. 2 (or from any intermediate position between the minimum height position and the maximum height position) causes the outer cylindrical element 24 to move axially upwards, lifting the spring 12 therewith, until it reaches the maximum height position of FIG. 3, or a position lower than the maximum height position. If, on the other hand, starting from the maximum height position of FIG. 3 (or from any intermediate position between the minimum height position and the maximum height position), the working chamber 26 is discharged, the outer cylindrical element 24, along with the spring 12, moves axially downwards until it reaches the minimum height position of FIG. 2, or a position higher than the minimum height position.

As already stated above, according to an aspect of the invention the working chamber 26 is wholly enclosed by the two cylindrical elements 22 and 24. To this end, according to the illustrated embodiment the inner cylindrical element 22 has a first outer cylindrical surface 22a, along which a first inner cylindrical surface 24a of the outer cylindrical element 24 is slidable, and a second outer cylindrical surface 22b having a larger diameter than the first outer cylindrical surface 22a, along which a second inner cylindrical surface 24b of the outer cylindrical element 24 having a larger diameter than the first inner cylindrical surface 24a is slidable. The first outer cylindrical surface 22a and the second outer cylindrical surface 22b of the inner cylindrical element 22 are adjacent to each other, the first surface being placed above the second one. The two cylindrical surfaces 22a and 22b of the inner cylindrical element 22 are separated by a shoulder forming an abutment surface 22c facing upwards. The first inner cylindrical surface 24a and the second inner cylindrical surface 24b of the outer cylindrical element 24 are adjacent to each other, the first surface being placed above the second one. The two cylindrical surfaces 24a and 24b of the outer cylindrical element 24 are separated by a shoulder forming an abutment surface 24c facing downwards. The working chamber 26 is therefore delimited radially between the first outer cylindrical surface 22a of the inner cylindrical element 22 and the second inner cylindrical surface 24b of the outer cylindrical element 24 and axially between the abutment surface 22c of the inner cylindrical element 22 and the abutment surface 24c of the outer cylindrical element 24.

As shown in FIG. 2, the minimum height position of the actuator 20 is defined by the abutment of the abutment surface 22c of the inner cylindrical element 22 against the abutment surface 24c of the outer cylindrical element 24. In this condition, the working chamber 26 is empty. As shown in FIG. 3, the maximum height position of the actuator 20 is defined by the abutment of an abutment surface 32a, facing upwards, of a stop element 32, which is made for example as a ring nut and is screwed onto the bottom end of the outer cylindrical element 24, against an abutment surface 22d, facing downwards, of the inner cylindrical element 22.

Suitable seals 34 and 36 are interposed between the first outer cylindrical surface 22a and the first inner cylindrical surface 24a and between the second outer cylindrical surface 22b and the second inner cylindrical surface 24b to avoid oil leakages between these surfaces out of the actuator. Moreover, the actuator is preferably provided with a dust seal cap 38 attached to the inner cylindrical element 22.

In the above-described embodiment, the two cylindrical elements 22 and 24 are free to rotate relative to each other around the axis z. Therefore, such an embodiment cannot be used in those applications, such as for example MacPherson suspensions for steering wheels, where the spring plate must be prevented from rotating relative to the damper.

Figure 4:
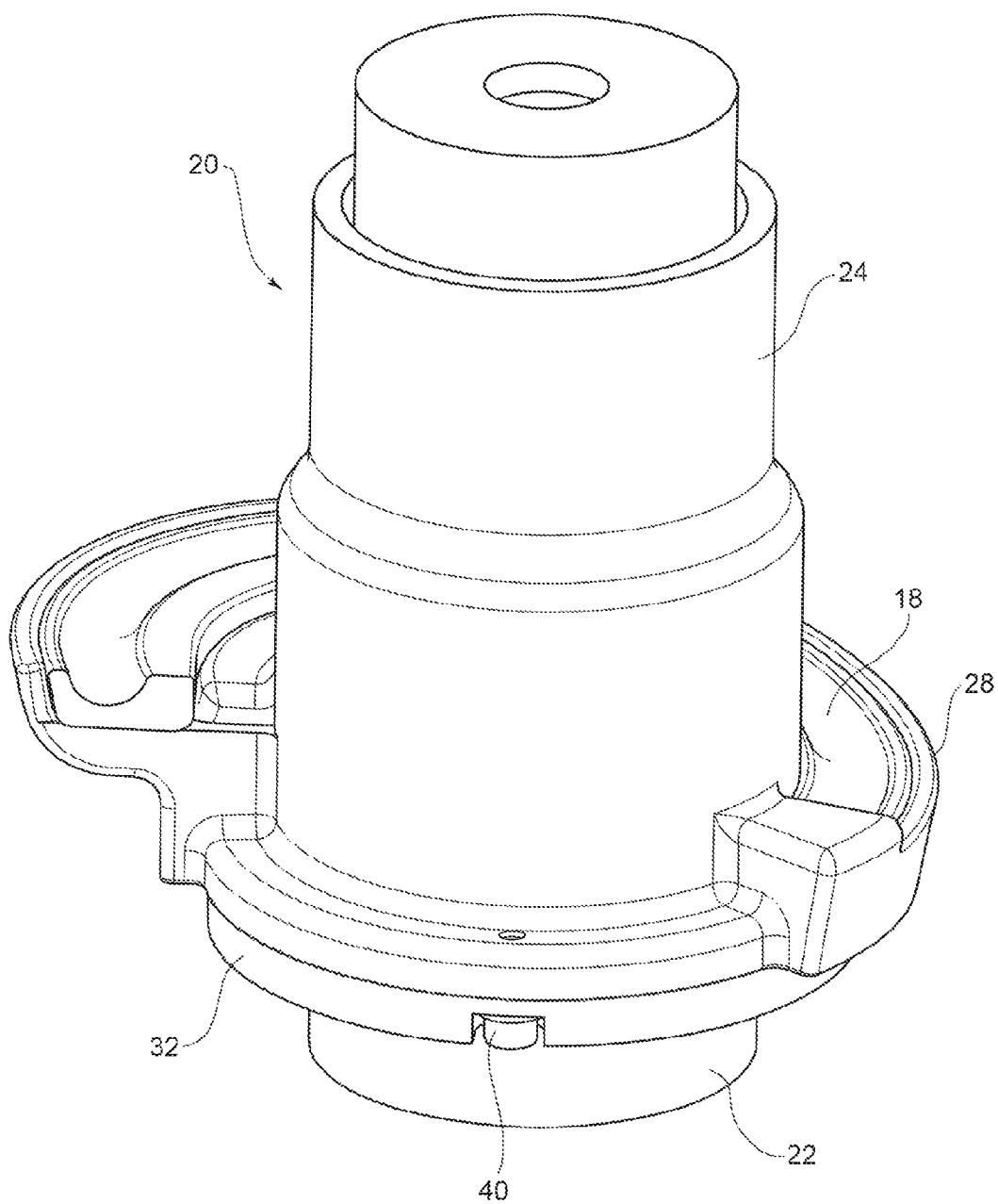
FIG. 4 is a perspective view of a linear actuator for a damper and spring unit for a vehicle suspension according to a second embodiment of the present invention.
Figure 5:
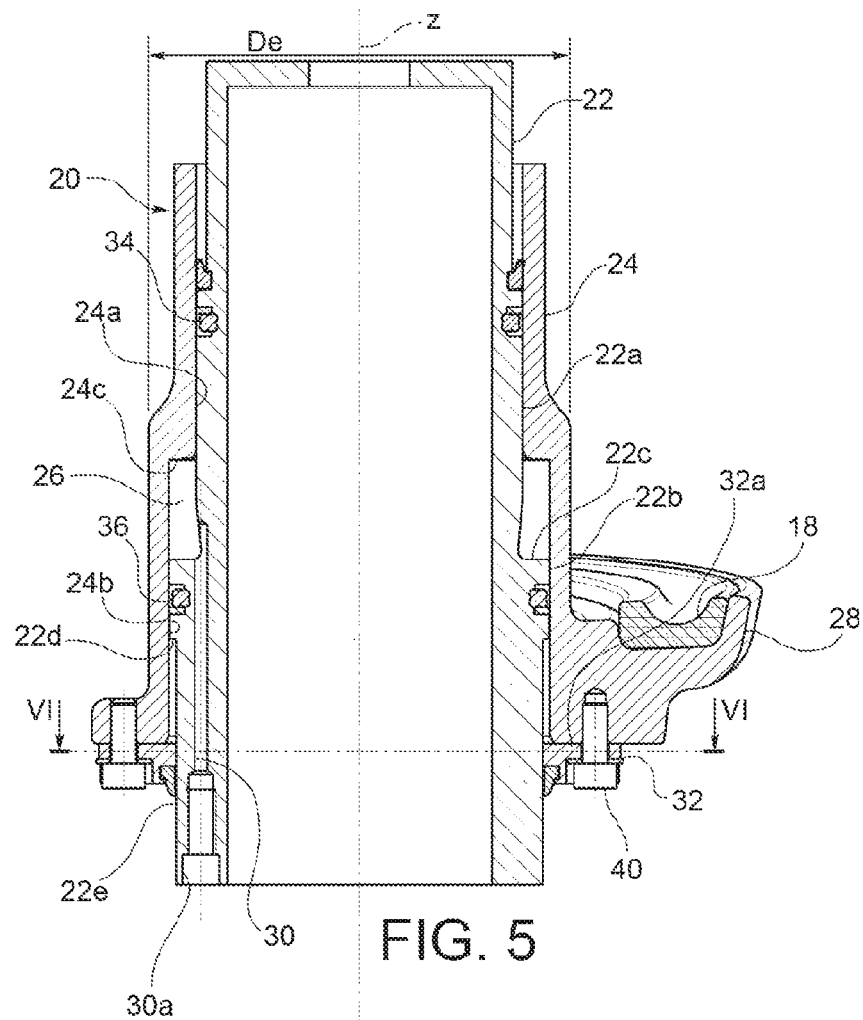
FIG. 5 is an axial section view of the linear actuator of FIG. 4.
Figure 6:
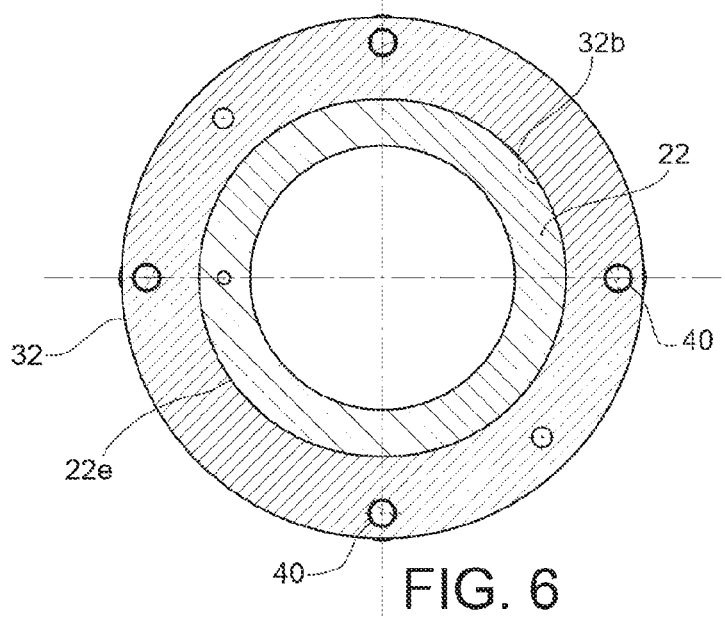
FIG. 6 is a cross section view through the section plane indicated VI-VI in FIG. 5.

With reference to FIGS. 4 to 6, where parts and elements identical or corresponding to those of FIGS. 1 to 3 have been given the same reference numerals, in a variant embodiment of the invention the actuator 20 is configured to be used on MacPherson suspensions for steering wheels and is therefore provided with rotation preventing mechanism arranged to prevent the outer cylindrical element 24 from rotating relative to the inner cylindrical element 22 around the axis z. The above description relating to the embodiment of FIGS. 1 to 3 is also applicable to the embodiment of FIGS. 4 to 6 and therefore will not be repeated. The main difference with respect to the embodiment of FIGS. 1 to 3 is that the stop element 32 acts also as rotation preventing mechanism for preventing the outer cylindrical element 24 from rotating relative to the inner cylindrical element 22 around the axis z. To this end, the stop element 32 has an inner surface 32b of non-circular shape, for example of elliptical shape, and the bottom end portion of the inner cylindrical element 22 has an outer surface 22e, along which the stop element 32 slides, having a complementary shape to that of the inner surface 32b. The stop element 32 is therefore prevented from rotating around the axis z relative to the inner cylindrical element 22. The stop element 32 is attached to the outer cylindrical element 24, for example by screws 40, and therefore the outer cylindrical element 24 is also prevented from rotating relative to the inner cylindrical element 22.

As shown in FIGS. 7 and 8, where parts and elements identical or corresponding to those of FIGS. 1 to 6 have been given the same reference numerals, in a further embodiment of the invention, which is also intended (like the embodiment of FIGS. 4 to 6) for use on MacPherson suspensions for steering wheels, the maximum height position of the actuator 20 is defined by a stop element 42 which is attached to the top end of the inner cylindrical element 22 and has an abutment surface 42a, facing downwards, arranged to cooperate with an abutment surface 24d, facing upwards, of the outer cylindrical element 24. The stop element 42 has for example the shape of an upside-down glass and is attached to the inner cylindrical element 22 by, for example, a threaded coupling 44.

According to this embodiment, the rigid rotational coupling between the outer cylindrical element 24 and the inner cylindrical element 22, and therefore between the support flange 28 and the cylinder 14 of the damper 10, is obtained by virtue of the outer surface 22b of the inner cylindrical element 22 being of non-circular shape, for example of elliptical shape, and the inner surface 24b of the outer cylindrical element 24 being of a complementary shape to that of the inner surface 22b.

Figure 9:
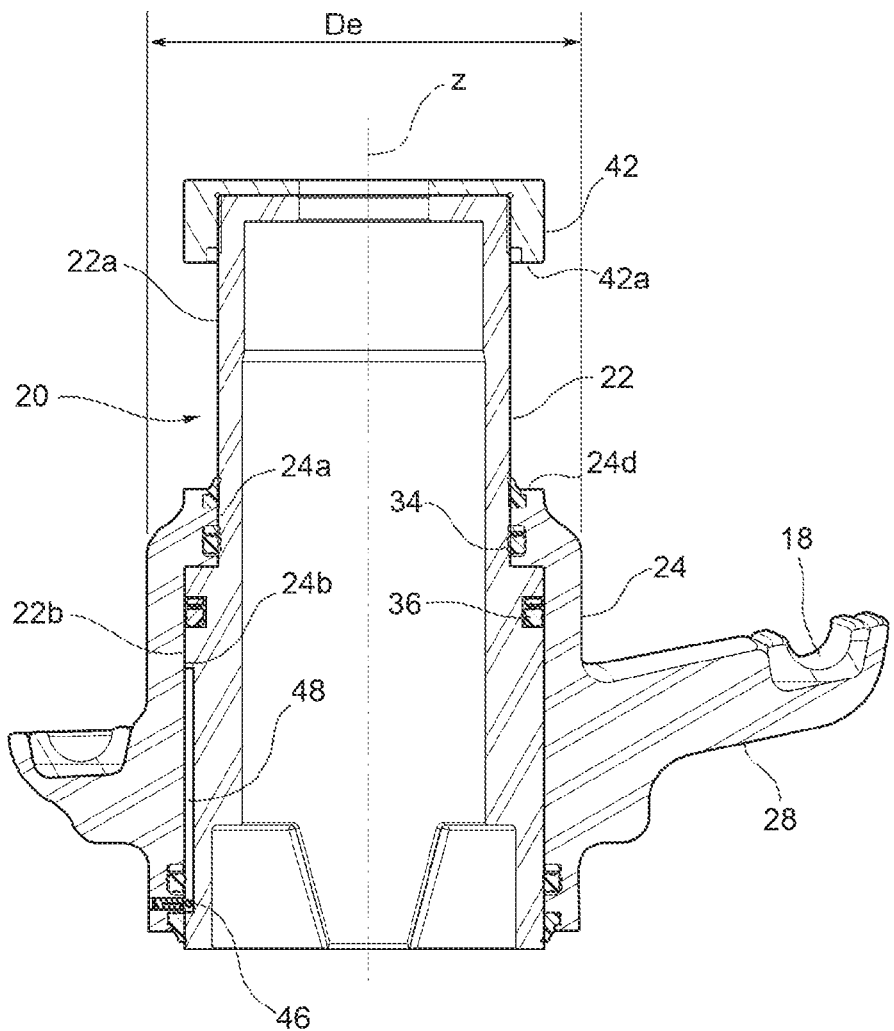
FIG. 9 is an axial section view of a linear actuator for a damper and spring unit for a vehicle suspension according to a fourth embodiment of the present invention in the minimum extension position, corresponding to the minimum vertical position of the bottom end of the spring.

A further embodiment of the invention is shown in FIG. 9, where parts and elements identical or corresponding to those of FIGS. 1 to 8 have been given the same reference numerals. According to this embodiment, which is also intended for use on MacPherson suspensions for steering wheels, the maximum extension position of the actuator 20 is also obtained by a stop element 42 mounted at the top end of the inner cylindrical element 22, as in the embodiment of FIGS. 7 and 8. The rotational coupling between the outer cylindrical element 24 and the inner cylindrical element 22 is obtained in this case by virtue of the engagement of one or more spring-loaded pins 46 carried by the outer cylindrical element 24 in respective vertical guide grooves 48 provided in the inner cylindrical element 22, in particular on the outer cylindrical surface 22b of this element.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:
1. A hydraulic linear actuator for adjusting the vertical position of a spring of a damper and spring unit for a vehicle suspension, the actuator comprising:
   an inner cylindrical element around a cylinder of the damper, an outer cylindrical element which is mounted around the inner cylindrical element and is axially slidable relative to the inner cylindrical element, and a working chamber which is disposed around the cylinder of the damper between the inner cylindrical element and the outer cylindrical element and is arranged to be filled with a fluid under pressure to adjust the axial position of the outer cylindrical element relative to the inner cylindrical element, wherein the working chamber is delimited, both radially and axially, between the inner cylindrical element and the outer cylindrical element, and wherein the outer cylindrical element is provided with a support flange arranged to support a bottom end of the spring, the support flange being placed beneath a top end of the outer cylindrical element, whereby the outer cylindrical element is at least partially arranged within the volume of the spring, and extending radially outwards with respect to the outer cylindrical element, whereby the inner diameter of the spring is larger than the outer diameter of the outer cylindrical element.

2. The actuator as set forth in claim 1, wherein the support flange is formed in one piece with the outer cylindrical element.

3. The actuator as set forth in claim 1, wherein the inner cylindrical element has a first outer cylindrical surface, along which a first inner cylindrical surface of the outer cylindrical element is slidable, and a second outer cylindrical surface, of larger diameter than the first outer cylindrical surface, along which a second inner cylindrical surface of the outer cylindrical element, of larger diameter than the first inner cylindrical surface, is slidable, wherein the first outer cylindrical surface and the second outer cylindrical surface of the inner cylindrical element are adjacent to each other, the first outer cylindrical surface being placed above the second outer cylindrical surface, and are separated from each other by a shoulder forming an abutment surface facing upwards, and wherein the first inner cylindrical surface and the second inner cylindrical surface of the outer cylindrical element are adjacent to each other, the first inner cylindrical surface being placed above the second inner cylindrical surface, and are separated from each other by a shoulder forming an abutment surface facing downwards, whereby the working chamber is delimited radially between the first outer cylindrical surface of the inner cylindrical element and the second inner cylindrical surface of the outer cylindrical element and axially between the abutment surface of the inner cylindrical element and the abutment surface of the outer cylindrical element.

4. The actuator as set forth in claim 1, further comprising a stop element which is attached to a bottom end of the outer cylindrical element and is arranged to act as an end-of-travel element for the upward movement of the outer cylindrical element relative to the inner cylindrical element.

5. The actuator as set forth in claim 1, further comprising a stop element which is attached to a top end of the inner cylindrical element and is arranged to act as an end-of-travel element for the upward movement of the outer cylindrical element relative to the inner cylindrical element.

6. The actuator as set forth in claim 1, further comprising a rotation preventing device for preventing the outer cylindrical element from rotating relative to the inner cylindrical element around the longitudinal axis of the actuator.

7. The actuator as set forth in claim 6, wherein said rotation preventing device comprises an outer surface with a cross-section of non-circular shape and an inner surface of a complementary shape to that of said outer surface, said outer surface being drivingly connected for rotation with the inner cylindrical element and said inner surface being drivingly connected for rotation with the outer cylindrical element.

8. The actuator as set forth in claim 7, further comprising a stop element which is attached to a bottom end of the outer cylindrical element and is arranged to act as an end-of-travel element for the upward movement of the outer cylindrical element relative to the inner cylindrical element, wherein the inner surface of said rotation preventing device is a surface formed by the stop element.

9. The actuator as set forth in claim 7, wherein the inner and outer surfaces of said rotation preventing device are formed by said second inner cylindrical surface and second outer cylindrical surface, respectively.

10. The actuator as set forth in claim 6, wherein said rotation preventing device comprises at least one vertical groove provided in the second outer cylindrical surface of the inner cylindrical element and at least one spring-loaded pin which is carried by the outer cylindrical element and engages in said at least one vertical groove.

11. A damper and spring unit for a vehicle suspension, comprising a damper with a cylinder and a rod, a spring arranged around the damper, and a hydraulic linear actuator interposed between the cylinder of the damper and a bottom end of the spring to change in a controlled manner the axial position of the spring relative to the cylinder of the damper, wherein the actuator including an inner cylindrical element mounted around the cylinder of the damper, and an outer cylindrical element which is mounted around the inner cylindrical element and is axially slidable relative to the inner cylindrical element, and a working chamber which is disposed around the cylinder of the damper between the inner cylindrical element and the outer cylindrical element and is arranged to be filled with a fluid under pressure to adjust the axial position of the outer cylindrical element relative to the inner cylindrical element, wherein the working chamber is delimited, both radially and axially, between the inner cylindrical element and the outer cylindrical element, and wherein the outer cylindrical element is provided with a support flange supporting the bottom end of the spring, the support flange being placed beneath a top end of the outer cylindrical element, whereby the outer cylindrical element is at least partially arranged within the volume of the spring, and extending radially outwards with respect to the outer cylindrical element, whereby the inner diameter of the spring is larger than the outer diameter of the outer cylindrical element.

12. A vehicle suspension comprising a damper with a cylinder and a rod, a spring arranged around the damper, and a hydraulic linear actuator interposed between the cylinder of the damper and a bottom end of the spring to change in a controlled manner the axial position of the spring relative to the cylinder of the damper, wherein the actuator includes an inner cylindrical element mounted around the cylinder of the damper, an outer cylindrical element which is mounted around the inner cylindrical element so as to be axially slidable relative to the inner cylindrical element and is arranged to support a bottom end of the spring, and a working chamber which is disposed around the cylinder of the damper between the inner cylindrical element and the outer cylindrical element and is arranged to be filled with a fluid under pressure to adjust the axial position of the outer cylindrical element relative to the inner cylindrical element,
wherein the working chamber is delimited, both radially and axially, between the inner cylindrical element and the outer cylindrical element, and
wherein the outer cylindrical element is provided with a support flange arranged to support the bottom end of the spring, the support flange being placed beneath a top end of the outer cylindrical element, whereby the outer cylindrical element is at least partially arranged within the volume of the spring, and extending radially outwards with respect to the outer cylindrical element, whereby the inner diameter of the spring is larger than the outer diameter of the outer cylindrical element.

* * * * *

UNITED STATES PATENT AND TRADEMARK OFFICE
CERTIFICATE OF CORRECTION

PATENT NO. : 9,834,058 B2
APPLICATION NO. : 14/955487
DATED : December 5, 2017
INVENTOR(S) : Massimo Seminara et al.

Page 1 of 1

It is certified that error appears in the above-identified patent and that said Letters Patent is hereby corrected as shown below:

Column 8, Line 29 (Claim 11) delete "including" and insert therefor --includes--.

Signed and Sealed this
Thirteenth Day of March, 2018

Andrei Iancu
*Director of the United States Patent and Trademark Office*